United States Patent [19]

Iida et al.

[11] Patent Number: 4,601,946

[45] Date of Patent: Jul. 22, 1986

[54] MAGNETIC RECORDING MEDIUM

[75] Inventors: Shinobu Iida; Nobutaka Yamaguchi; Fumiaki Tsukuda; Masaaki Fujiyama; Eiichi Tadokoro, all of Kanagawa, Japan

[73] Assignee: Fuji Photo Film Co., Ltd., Kanagawa, Japan

[21] Appl. No.: 634,517

[22] Filed: Jul. 26, 1984

[30] Foreign Application Priority Data

Jul. 26, 1983 [JP] Japan .................. 58-136336

[51] Int. Cl.$^4$ .............................. G11B 5/72
[52] U.S. Cl. ................... 428/323; 360/134; 360/135; 360/136; 252/62.54; 427/128; 427/131; 428/329; 428/330; 428/331; 428/408; 428/694; 428/695; 428/900

[58] Field of Search ............. 428/694, 695, 425.9, 428/329, 403, 407, 405, 330, 331; 427/132, 131; 252/62.54; 360/134-136

[56] References Cited

U.S. PATENT DOCUMENTS

| 3,423,233 | 1/1969 | Akashi | 428/900 |
| 4,361,627 | 11/1982 | Ohata | 428/694 |
| 4,420,532 | 12/1983 | Yamaguchi | 428/694 |
| 4,425,400 | 1/1984 | Yamaguchi | 428/694 |
| 4,448,842 | 5/1984 | Yamaguchi | 428/694 |
| 4,474,848 | 10/1984 | Yamaguchi | 428/694 |

Primary Examiner—Ellis P. Robinson
Attorney, Agent, or Firm—Sughrue, Mion, Zinn, Macpeak, and Seas

[57] ABSTRACT

A magnetic recording medium is disclosed which comprises a non-magnetic support having provided thereon a magnetic recording layer consisting ferromagnetic powder and containing graphite and a fatty acid ester.

23 Claims, No Drawings

MAGNETIC RECORDING MEDIUM

FIELD OF THE INVENTION

The present invention relates to a magnetic recording medium, and more particularly it relates to a magnetic recording medium having good still image like and providing reduced magnetic head wear.

BACKGROUND OF THE INVENTION

Almost all video tape recording decks for recording and playback of video images (VTR) developed recently are equipped with still mode settings for replaying still images. The magnetic recording medium used in such a VTR is required to have good still life, i.e., to be durable in a still mode operation for a long period of time. It is disclosed, for example, in U.S. Pat. No. 368,725 that various abrasives can be incorporated in the recording medium to improve the still life. However, when a large quantity of abrasives is added to improve still life as described in U.S. Pat. No. 4,135,016, wear of the magnetic head is greatly increased and the life of the head is correspondingly reduced. In known magnetic recording media, it has been very difficult to satisfy both requirements of good still life and reduced head wear.

SUMMARY OF THE INVENTION

A first object of the present invention is to provide a magnetic recording medium having good still life.

A second object of the present invention is to provide a magnetic recording medium having reduced head wear.

As a result of thorough investigations, it has been found that these and other objects of the present invention can be attained by a magnetic recording medium comprising a non-magnetic support having coated thereon a magnetic layer, said magnetic layer containing graphite and an ester of a fatty acid.

DETAILED DESCRIPTION OF THE INVENTION

The graphite which is used in the present invention is not unduly limited, and can be natural graphite or artificial graphite in particular having a flake shape, a granular shape, or a lump (plumbago) shape. Among these, flake shaped graphite is superior because it provides greater reduction of head wear. The particle size of the graphite used can be selected as desired, it preferably has an average primary particle size of about 0.01 to $3\mu$, more preferably about 0.05 to $1\mu$, and most preferably about 0.1 to $0.5\mu$. If the particle size is larger than about $3\mu$, the electromagnetic properties of the resulting magnetic medium are adversely affected, and it is smaller than about $0.01\mu$, satisfactory lubricating effect cannot be obtained.

The amount of graphite added is from about 0.1 to 10 parts by weight and preferably from about 0.5 to 5 parts by weight per 100 parts by weight of magnetic particles. If the amount added is smaller, still life is reduced and dropouts increase. If the amount is larger, electromagnetic properties are adversely affected.

The fatty acid ester used in the present invention is an ester of a fatty acid having 2 to 22 carbon atoms and an alcohol having 2 to 27 carbon atoms, preferably an ester of a fatty acid having 6 to 18 carbon atoms and an alcohol having 2 to 14 carbon atoms. Both saturated and unsaturated fatty acids can be used. Preferred alcohols are monohydric alcohols, but dihydric and trihydric alcohols can be also used.

The amount of fatty acid ester used in the present invention is from about 0.05 to 10 parts by weight, preferably from about 0.1 to 5 parts by weight per 100 parts by weight of magnetic particles. A fatty acid ester can be used alone or a mixture of at least two kinds of fatty acid esters can be used.

Examples of suitable fatty acid esters include amyl stearate, butyl stearate, ethyl stearate, butyl myristate, oleyl oleate, butyl palmitate, etc. Of these, amyl stearate, butyl stearate and ethyl stearate are preferred with amyl stearate and butyl stearate being most preferred. Still life can be further increased by the addition of abrasives having Mohs hardness of 6 or more, preferably 6 to 9 such as $Cr_2O_3$, alumina, garnet, $\alpha-Fe_2O_3$ or SiC, to the above described graphite and fatty acid ester. The amount of the abrasive added is from about 0.1 to 30 parts by weight, preferably from about 1 to 20 parts by weight per 100 parts by weight of magnetic particles. The average particle size of the abrasive is from about 0.05 to $5\mu$, preferably from 0.1 to $2\mu$.

The electromagnetic properties of the magnetic recording medium can be further improved by smoothing the nonmagnetic support to a center line average roughness (Ra) of about $0.035\mu$ (cut off 0.08 mm) or less, preferably about 0.025 or less. However, a support surface thus smoothed may adversely affect the running properties of the magnetic recording medium on a VTR. In addition, dropouts can be caused by the scraped tips of the support putting on the magnetic layer. Both of these problems can be avoided by (1) using a support having different surface smoothnesses on opposite surfaces, (2) providing a backing layer or (3) providing a layer containing a lubricant on the surface of the support opposite to the magnetic layer. Among these methods, the third is most effective because each layer has a separate function. If a backing layer is used carbon black and graphite particles are preferably incorporated into the backing layer to prevent electrostatic charging.

It is preferred that carbon black is additionally included in the magnetic layer. Because of its antistatic effect, which is useful for preventing dropout of signals caused by attached dust.

The carbon black which can be used in the present invention has an average particle size of about 30 m$\mu$ or less, preferably about 10 to 30 m$\mu$ and more preferably about 15 to 25 m$\mu$.

Carbon black is added to the magnetic recording layer in an amount of from about 0.1 to 10 parts by weight and preferably from about 0.5 to 5 parts by weight per 100 parts by weight of magnetic particles. Various additives, supports and the methods for preparing the magnetic recording tapes are described in U.S. Pat. No. 4,135,016.

The present invention is illustrated in more detail by the following Examples, but the present invention is not to be construed as being limited thereto. Materials, quantities and the sequence of operation can be changed by those skilled in the art so long as the gist of the present invention is not essentially changed.

In the Examples and Comparative Examples, all parts percents and ratios are by weight unless otherwise indicated.

EXAMPLE 1

| | |
|---|---|
| Co-containing γ-Fe$_2$O$_3$ | 100 parts |
| Graphite (Flake Shaped, Average Primary Particle Size: 0.3μ) | 5 parts |
| Fatty Acid Ester (Butyl Stearate) | 1 part |
| Copolymer of Vinyl Chloride and Vinyl Acetate Containing a Carboxylic Group (Mol Ratio: 83:9:8; Molecular Weight: 30,000) | 20 parts |
| Polyurethane Resin (Molecular Weight: 50,000) | 20 parts |
| Polyisocyanate (Molecular Weight: 656) | 20 parts |
| Abrasive (Cr$_2$O$_3$; Average Particle Size: 0.6μ) | 6 parts |
| Methyl Ethyl Ketone | 150 parts |
| Butyl Acetate | 150 parts |

The above composition was milled in a ball mill for 20 hours, and was adjusted to a viscosity of 40 poise by adding a mixed solvent of methyl ethyl ketone and butyl acetate (1:1 by weight) and agitating the mixture in an agitater and then coated on a polyester support having a thickness of 15μ and a surface smoothness of Ra 0.035μ in a thickness of 5μ (the same thickness used in the following Examples) to prepare Sample No. 1.

COMPARATIVE EXAMPLE 1

Comparative Sample No. 2 was prepared in the same manner as in Example 1 except that graphite and the fatty acid ester were omitted from the composition.

EXAMPLE 2

| | |
|---|---|
| Co-containing γ-Fe$_2$O$_3$ | 100 parts |
| Graphite (Flake Shaped, Average Primary Particle Size: 0.3μ) | 5 parts |
| Fatty Acid Ester (Butyl Stearate) | 1 parts |
| Vinyl Chloride-Vinyl Acetate Copolymer Containing a Carboxylic Group (Mol Ratio: 83:9:8; Molecular Weight: 30,000) | 20 parts |
| Polyurethane Resin (Molecular Weight: 50,000) | 20 parts |
| Polyisocyanate (Molecular Weight: 656) | 20 parts |
| Abrasive (Cr$_2$O$_3$; Average Particle Size: 0.6μ) | 6 parts |
| Carbon Black (Average Primary Particle Size: 30 mμ) | 5 parts |
| Methyl Ethyl Ketone | 150 parts |
| Butyl Acetate | 150 parts |

Sample No. 3 having the above composition was prepared in the same manner as in Example 1 except that carbon black was added to the composition.

Sample Nos. 4, 5 and 6 were prepared in the same manner as above except that graphite having a particle size of 0.5μ, 1μ and 3μ, respectively, was used.

COMPARATIVE EXAMPLE 2

Comparative Sample No. 7 was prepared in the same manner as Example 2 except that graphite and fatty acid ester were omitted from the composition of Example 2. Comparative Sample No. 8 was prepared in the same manner as Example 2 but only graphite was omitted therefrom and Comparative Sample No. 9 was prepared in the same manner but the fatty acid ester was omitted.

EXAMPLE 3

Sample No. 10 was prepared by coating the same magnetic recording layer as in Example 2 on one surface of the same support as in Example 2, and further coating a backing layer having the following formulation in a thickness of 5μ (the same as used in the following Examples) on the opposite surface thereof.

| | |
|---|---|
| Carbon Black (Average Primary Particle Size: 90 mμ) | 100 parts |
| Nitrocellulose (Molecular Weight: 27,000; Degree of Nitration: 12.0) | 30 parts |
| Polyurethane Resin (Molecular Weight: 25,000) | 5 parts |
| Copolymer of Vinylidene Chloride-Acrylonitrile (Mol Ratio: 80:20; Molecular Weight: 30,000) | 15 parts |
| Polyisocyanate (Molecular Weight: 656) | 25 parts |
| Calcium Carbonate | 50 parts |
| α-Fe$_2$O$_3$ (Average Particle Size: 1.0μ) | 2 parts |
| Methyl Ethyl Ketone | 1,000 parts |
| Butyl Acetate | 500 parts |

COMPARATIVE EXAMPLE 3

Comparative Sample Nos. 11, 12 and 13 were prepared in the same manner as in Example 2 except that instead of fatty acid ester of Example 2, a fatty acid (oleic acid), silicone (dimethyl polysiloxane) and liquid paraffin, were used, respectively.

Comparative Sample No. 14 was prepared by substituting a fatty acid ester for a fatty acid (oleic acid) and by increasing the amount of the abrasive to 30 parts.

EXAMPLE 4

| Magnetic Recording Layer | |
|---|---|
| Co-containing FeOx (x = 1.4) (Average Particle Size: 0.3μ × 0.03μ; Co/Fe = 3/97) | 100 parts |
| Graphite (Flake Shaped, Average Primary Particle Size: 0.4μ) | 7 parts |
| Fatty Acid Ester (Amyl Stearate) | 1 part |
| Fatty Acid Ester (Ethyl Stearate) | 1 part |
| Fatty Acid (Myristic Acid) | 0.5 part |
| Silicone Oil (Dimethyl Polysiloxane) | 0.1 part |
| Copolymer of Vinyl Chloride-Vinyl Acetate-Vinyl Alcohol (Mol Ratio: 90:3:7; Molecular Weight: 22,000) | 25 parts |
| Polyurethane Resin (Molecular Weight: 50,000) | 15 parts |
| Polyisocyanate (Molecular Weight: 656) | 25 parts |
| Abrasive (α-Al$_2$O$_3$; Average Particle Size: 0.4μ) | 5 parts |
| Carbon Black (Average Primary Particle Size: 20 mμ) | 10 parts |
| Toluene | 150 parts |
| Butyl Acetate | 150 parts |
| Backing Layer | |
| Carbon Black (Average Primary Particle Size: 30 mμ) | 100 parts |
| Graphite (Flake Shaped, Average Primary Particle Size: 0.4μ) | 100 parts |
| Copolymer of Vinyl Chloride and Vinyl Acetate Containing a Carboxylic Group) (Mol Ratio: 83:9:8; Molecular Weight: 30,000) | 75 parts |
| Polyurethane Resin (Molecular Weight: 30,000) | 35 parts |
| Polyisocyanate (Molecular Weight: 656) | 50 parts |
| Talc Powder (Average Particle Size: 1.5μ) | 50 parts |
| Calcium Carbonate | 50 parts |
| Goethite (Average Particle Size: 1.2μ × 0.2μ (Acicular)) | 50 parts |
| Methyl Ethyl Ketone | 1,000 parts |
| Cyclohexanone | 300 parts |

The above described composition for the magnetic layer was milled in a three roll mill (30 passes) and then a sand grinder (5 kg/min, 10 passes) and the above described composition for the backing layer was also milled and each composition was coated on a polyester support having a thickness of 20 μm and a surface smoothness Ra: 0.020μ, respectively, on opposite surfaces to prepare Sample No. 15.

equals the dropouts (number/min.) which were observed on a TV monitor over a period of at least 12 minutes. The results are shown in the following Table.

TABLE

| Sample No. | Example or Comparative Example | Size of graphite | Amount of abrasive | Fatty acid ester | Size of carbon black | Backing | Back coat | Still life (min) | Head wear (μ/100 h) | Video S/N (dB) | Dropout (number/min) | |
| --- | --- | --- | --- | --- | --- | --- | --- | --- | --- | --- | --- | --- |
| 1 | Example 1 | 0.3μ | | Butyl Stearate | None | None | | >400 | 3.0 | +2.3 | 35 | bad runability |
| 2 | Comparative Example 1 | None | | None | None | None | | <1 | >30 | −1.5 | 250 | bad runability |
| 3 | Example 2 | 0.3μ | | Butyl Stearate | 20 mμ | None | | >400 | 1.5 | +2.3 | 13 | |
| 4 | Example 2 | 0.5μ | | Butyl Stearate | 20 mμ | None | | >400 | 1.8 | +2.2 | 17 | |
| 5 | Example 2 | 1.0μ | | Butyl Stearate | 20 mμ | None | | >400 | 2.3 | +1.6 | 20 | slightly bad filtration of liquid (*) |
| 6 | Example 2 | 3.0μ | | Butyl Stearate | 20 mμ | None | | >400 | 5.0 | −0.5 | 35 | bad filtration of liquid (*) |
| 7 | Comparative Example 2 | None | | None | 20 mμ | None | | <1 | 20 | +0.5 | 75 | |
| 8 | Comparative Example 2 | None | | Butyl Stearate | 20 mμ | None | | 25 | 8 | +1.8 | 60 | |
| 9 | Comparative Example 2 | 0.3μ | 6 parts | None | 20 mμ | | None | 3 | 15 | +0.7 | 60 | |
| 10 | Example 3 | 0.3μ | 6 parts | Butyl Stearate | 20 mμ | | Provided | >400 | 1.3 | +2.1 | 3 | |
| 11 | Comparative Example 3 | 0.3μ | 6 parts | None (fatty acid) | 20 mμ | | None | 10 | 1.3 | +2.3 | 14 | |
| 12 | Comparative Example 3 | 0.3μ | 6 parts | None (silicone) | 20 mμ | | None | 2 | 0.9 | +1.6 | 17 | |
| 13 | Comparative Example 3 | 0.3μ | 6 parts | None (liquid paraffin) | 20 mμ | | None | 7 | 1.5 | +2.0 | 16 | |
| 14 | Comparative Example 3 | None | 30 parts | None (fatty acid) | 20 mμ | | None | 250 | >30 | +1.9 | 90 | |
| 15 | Example 4 | 0.3μ | 5 parts (smooth surface support) | Amyl Stearate/Ethyl Stearate | 20 mμ | | Provided | >400 | 0.9 | +2.3 | 3 | |
| 16 | Example 5 | 0.3μ | 0.05 part | Butyl Stearate | 20 mμ | | Provided | 300 | 0.8 | +1.0 | 4 | |
| 17 | Example 5 | 0.3μ | 0.1 part | Butyl Stearate | 20 mμ | | Provided | >400 | 0.8 | +2.2 | 3 | |
| 18 | Example 5 | 0.3μ | 1 part | Butyl Stearate | 20 mμ | | Provided | >400 | 1.0 | +2.2 | 4 | |
| 19 | Example 5 | 0.3μ | 10 parts | Butyl Stearate | 20 mμ | | Provided | >400 | 1.5 | +2.1 | 3 | |
| 20 | Example 5 | 0.3μ | 20 parts | Butyl Stearate | 20 mμ | | Provided | >400 | 3.0 | +2.0 | 3 | |
| 21 | Example 5 | 0.3μ | 30 parts | Butyl Stearate | 20 mμ | | Provided | >400 | 7.0 | +2.0 | 5 | |
| 22 | Example 5 | 0.3μ | 40 parts | Butyl Stearate | 20 mμ | | Provided | >400 | 15 | +1.7 | 4 | |

(*) Time required for filtering through a filter having a thickness of 3 μm at a pressure of 2 kg/cm$^2$ was measured.

EXAMPLE 5

The same procedure as in Example 3 was repeated except that the amount of the abrasive ($Cr_2O_3$) was changed to 0.05 part, 0.1 part, 1 part, 10 parts, 20 parts, 30 parts and 40 parts, respectively to prepare Sample Nos. 16, 17, 18, 19, 20, 21 and 22.

The thus-prepared magnetic tape samples were evaluated using a VHS type VTR. Still life was determined by measuring the time (min.) required for recorded images of the samples replayed in the still mode of the VTR to disappear. Head wear is shown by the degree of wear (μ) resulting when the samples were run on the VTR for 100 hours. Video S/N is shown by the relative value (dB) to the standard magnetic tape prepared by Fuji Photo Film Co., Ltd. The dropout measurement Comparison of Sample No. 3 (invention) with Sample Nos. 7, 8 and 9 (Comparative Samples) demonstrates that still life and head wear resistance are remarkably improved along with video S/N and dropout characteristics only when graphite and a fatty acid ester are present in a magnetic recording layer according to the invention.

If the fatty acid ester in Sample No. 3 is replaced by other lubricants, the surprising improvements obtained by using a fatty acid ester in combination with graphite were not observed (Sample Nos. 11, 12 and 13).

In addition the results obtained using Sample Nos. 1, 3 and 10 show that the addition of carbon black to the magnetic layer and the coating of a backing layer was preferable. Sample Nos. 3 to 6 demonstrate that the use of graphite having a particle size of not more than 0.5μ is preferable.

Sample Nos. 10, 16, 17, 18, 19, 20, 21 and 22 demonstrate that if the amount of abrasive ($Cr_2O_3$) is reduced the S/N ratio is decreased and still life is reduced, and that if the amount of an abrasive is increased, head wear also increases. The amount of the abrasive is preferably 1 to 20 parts by weight based on 100 parts by weight of magnetic particles.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having provided thereon a magnetic recording layer consisting essentially of a ferromagnetic powder and containing graphite, a fatty acid ester and a binder, wherein the graphite is selected from the group consisting of flake shaped graphite, granular graphite or plumbago shaped graphite, the graphite having an average primary particle size of about 0.01 to 3 micron and being present in an amount from about 0.1 to 10 parts by weight per 100 parts by weight of the ferromagnetic powder and the fatty acid ester being an ester of a fatty acid having 6 to 22 carbon atoms and an alcohol having 2 to 27 carbon atoms, the fatty acid ester being present in an amount from about 0.05 to 10 parts by weight per 100 parts by weight of the ferromagnetic powder.

2. The magnetic recording medium claimed in claim 1, wherein said average primary particle size of graphite is from about 0.1 to 0.5μ.

3. The magnetic recording medium claimed in claim 1, wherein said graphite is present in an amount of from about 0.5 to 5 parts by weight per 100 parts by weight of magnetic particles.

4. The magnetic recording medium claimed in claim 1, wherein said fatty acid ester is an ester of a fatty acid having 6 to 18 carbon atoms and an alcohol having 2 to 14 carbon atoms.

5. The magnetic recording medium claimed in claim 4, wherein said alcohol is a monohydric alcohol.

6. The magnetic recording medium claimed in claim 1, wherein said fatty acid ester is present in an amount of from about 0.1 to 5 parts by weight per 100 parts by weight of magnetic particles.

7. The magnetic recording medium claimed in claim 1, wherein said magnetic layer further comprises an abrasive have a Mohs hardness of at least 6.

8. The magnetic recording medium claimed in claim 7, wherein said abrasive is selected from the group consisting of $Cr_2O_3$, alumina, garnet, $\alpha$—$Fe_2O_3$ and SiC.

9. The magnetic recording medium claimed in claim 8, wherein said abrasive is present in an amount of from about 0.1 to 30 parts by weight per 100 parts by weight of magnetic particles.

10. The magnetic recording medium claimed in claim 9, wherein said abrasive is present in an amount of from about 1 to 20 parts by weight per 100 parts by weight of magnetic particles.

11. The magnetic recording medium claimed in claim 7, wherein said abrasive has an average particle size of from about 0.05 to 5μ.

12. The magnetic recording medium claimed in claim 1, wherein said magnetic layer further comprises carbon black having an average particle size of about 30 mμ or less.

13. The magnetic recording medium claimed in claim 12, wherein said carbon black has an average particle size of about 10 to 30 mμ.

14. The magnetic recording medium claimed in claim 13, wherein said carbon black has an average particle size of about 15 to 25 mμ.

15. The magnetic recording medium claimed in claim 12, wherein said carbon black is present in an amount of from about 0.1 to 10 parts by weight per 100 parts by weight of magnetic particles.

16. The magnetic recording medium claimed in claim 15, wherein said carbon black is present in an amount of from about 0.5 to 5 parts by weight per 100 parts by weight of magnetic particles.

17. The magnetic recording medium claimed in claim 1, wherein said magnetic recording medium further comprises a backing layer containing a lubricant on the surface of the support opposite to the magnetic layer.

18. The magnetic recording medium claimed in claim 1, wherein said magnetic layer further comprises an abrasive and carbon black.

19. A magnetic recording medium as claimed in claim 1 exhibiting a good still life and reduced head wear.

20. A magnetic recording medium as claimed in claim 19, wherein said fatty acid ester is selected from the group consisting of amyl stearate, butyl stearate, ethyl stearate, butyl myristate, oleyl oleate and butyl palmitate.

21. A magnetic recording medium as claimed in claim 19, wherein said fatty acid ester is selected from the group consisting of amyl stearate, butyl stearate and ethyl stearate.

22. A magnetic recording medium as claimed in claim 19, wherein said fatty acid ester is selected from the group consisting of amyl stearate and butyl stearate.

23. The magnetic recording medium as claimed in claim 1, wherein the average primary particle size of the graphite is from about 0.05 to 1μ.

* * * * *